(12) United States Patent
Rantala et al.

(10) Patent No.: US 7,765,901 B2
(45) Date of Patent: Aug. 3, 2010

(54) METHOD AND DEVICE FOR CUTTING OFF A THICK-WALLED PIPE

(75) Inventors: Jari Rantala, Isokyrö (FI); Keijo Salminen, Isokyrö (FI)

(73) Assignee: Plantool Oy, Seinajoki (FI)

( * ) Notice: Subject to any disclaimer, the term of this patent is extended or adjusted under 35 U.S.C. 154(b) by 768 days.

(21) Appl. No.: 11/576,831

(22) PCT Filed: Oct. 7, 2005

(86) PCT No.: PCT/FI2005/050350

§ 371 (c)(1),
(2), (4) Date: Apr. 6, 2007

(87) PCT Pub. No.: WO2006/037863

PCT Pub. Date: Apr. 13, 2006

(65) Prior Publication Data

US 2008/0028905 A1    Feb. 7, 2008

(30) Foreign Application Priority Data

Oct. 8, 2004    (FI) .................................. 20045377

(51) Int. Cl.
*B23B 31/16*    (2006.01)
*B23B 5/12*    (2006.01)
(52) U.S. Cl. ...................................... 82/1.11
(58) Field of Classification Search ............... 82/1.11, 82/46, 47, 54, 83, 84; 279/114, 111, 121; 409/167, 277, 278
See application file for complete search history.

(56) References Cited

U.S. PATENT DOCUMENTS 4,097,053 A    6/1978  Steinberger
5,009,136 A    4/1991  Glomb et al.

FOREIGN PATENT DOCUMENTS

| DE | 10133856 A1 | 1/2003 |
|----|-------------|--------|
| GB | 583893 A    | 1/1947 |
| GB | 884591 A    | 12/1961 |
| GB | 2406304 A   | 3/2005 |
| JP | 57-114319 A | 7/1982 |
| JP | 6-114625 A  | 4/1994 |
| JP | 9239614 A   | 9/1997 |
| JP | 10-180537 A | 7/1998 |
| SU | 1207657 A   | 1/1986 |

*Primary Examiner*—Will Fridie, Jr.
(74) *Attorney, Agent, or Firm*—Seyfarth Shaw LLP

(57) ABSTRACT

The invention relates to a method for cutting off a thick-walled pipe 3, wherein the pipe to be cut comprises an inner circumference closer to the longitudinal axis of the pipe and an outer circumference further from the longitudinal axis of the pipe. The method comprises bringing the cut-off point of the pipe to the cut-off point of a sawing unit, locking the pipe in its place by means of a fastener, sawing the pipe at the cut-off point by moving a saw 2 of the sawing unit towards the center of the pipe 3, the sawing unit comprising at least two saws. The method is characterized by moving each saw 2 of the sawing unit during the sawing radially towards the centre of the pipe until the saw blades pass through the inner surface of the pipe, and rotating the pipe during the sawing with respect to its longitudinal axis by means of a rotating device 10 connected to the fastener until the pipe is cut off, whereby, due to the rotating of the pipe, the blades 25 of the saw 2 work the pipe during a blade revolution only in one direction, which is directed from the outer circumference towards the inner circumference. Furthermore, the invention provides a saw assembly and a rotating device for implementing the method.

9 Claims, 10 Drawing Sheets

METHOD AND DEVICE FOR CUTTING OFF A THICK-WALLED PIPE

This application is a U.S. National Phase of International Patent Application Ser. No. PCT/FI2005/050350, filed Oct. 7, 2005 which claims priority to Finnish Patent Application No. 20045377 filed Oct. 8, 2004.

BACKGROUND OF THE INVENTION

The invention relates to a method and device for cutting off a thick-walled pipe. In this description a thick-walled pipe refers to a pipe with a wall thickness of approximately 10 to 50 mm. The outer diameters of such pipes may vary between 80 and 400 mm, for instance.

According to the prior art, a pipe is cut off by a single-blade saw. In single-blade cutting, the diameter of the blade should be larger than the diameter of the pipe to be cut. Also, the thickness of the blade with a large diameter is great and the structure of the saw is sufficiently firm to use the blade with a large diameter. A greater thickness of the blade causes material losses. Furthermore, it is expensive to acquire big blades.

Patent publication GB 884591 A discloses a solution with two cutting blades, wherein a pipe is sawn towards the centre with two saws to accelerate the cutting procedure. In this solution, as the blades approach each other, one of the blades is withdrawn and the other one finishes the cutting procedure. In this solution, blade costs are doubled because both blades should have at least the size of the pipe diameter. In addition, such a saw with two big blades has a power demand that is considerably greater than that of the saw mentioned previously.

In both prior art solutions, during one blade revolution the blade comes into contact with the pipe wall twice after passing through the pipe wall. If a thick-walled pipe is cut off, a problem arises that a sizable chip removed from the first wall will not necessarily be detached from the throat of the blade before it touches the wall a second time during the same blade revolution. This makes the cutting less effective and may result in breaking of the blade.

BRIEF DESCRIPTION OF THE INVENTION

It is an object of the invention to provide a method and an apparatus for implementing the method so as to solve the above problems. The object of the invention is achieved by a method and an apparatus which are characterized by what is stated in the independent claims. The preferred embodiments of the invention are disclosed in the dependent claims.

One of the objects of the present invention is to provide a method for cutting off a thick-walled pipe, the method comprising driving blades radially towards the centre of the pipe, simultaneously rotating the pipe at low speed. The radial driving is stopped after the blade has passed through the pipe wall. The rotating will be continued until the pipe has been cut off, after which the units are restored to their original position.

Another object of the present invention is to provide a rotating device for cutting off a thick-walled pipe. The rotating device comprises a first rotating frame rotatable with a motor, a body part attached to the rotating frame, a second fastening frame rotatable with a motor and connected pivotally between the rotating frame and the body part. The rotating device also comprises fastening means connected to the body part and arranged to move in the radial direction, and a spiral ring fastened to the fastening frame and fastened to the fastening means so that, as the spiral ring rotates with respect to the rotating frame and the body part fastened thereto, the fastening means move in the radial direction.

A further object of the present invention is to provide a saw assembly implementing the method, comprising a fastener for locking the pipe to be sawn in its place, the fastener comprising gripping means arranged to move perpendicularly to the longitudinal axis of the pipe. The assembly also comprises a sawing unit with at least two saws. In the saw assembly there is provided a rotating device in connection with the fastener for rotating the pipe with respect to its longitudinal axis during sawing.

The method according to the invention provides an assembly, whose instrument costs are lower, because one big blade (e.g. with a diameter of 630 mm) may cost more than three small blades e.g. with diameters of 250 mm. Compared to big blades, blades with smaller diameters save material, because the thickness of big blades is approximately 6 to 10 mm, for instance, and that of small blades approximately 1.5 to 5 mm or only approximately 1.5 to 3 mm, for instance. Losses caused by the blade thickness may be significant, especially when the sections to be cut off are short.

By employing conventional technology, the throat of the blade may be blocked by a chip, which breaks the blade when it comes into contact with the second wall. In the method of the present invention and in the apparatus rotating the pipe and implementing the method, this is avoided by rotating the pipe. By rotating the pipe, the pipe cutting is, in a way, changed into solid cutting, because the blade comes into contact with the wall to be cut only once during one blade revolution. A chip to be detached can be removed conventionally at the end section of the revolution into a cutting liquid, for example. The pipe and the blade rotate preferably in the opposite directions. Due to this, feeding is the optimal alternative for the blade usage. It is also possible that in some embodiments the rotating direction of the pipe may be the same as the rotating direction of the blade.

As the pipe is rotated, the feed rate of the saw units can be increased because, due to the more efficient chip removal, the risk that the blade will get broken is smaller. When saw units are smaller, the firm structure of a saw assembly is easier to implement. Furthermore, the saw assembly with smaller blades requires less power than the assembly with big blades. The cutting procedure can be accelerated when a plurality of saw units are used. The number of saw units may be 2 to 4, for instance. The rotating of the pipe also allows that a thick-walled pipe can be cut off by using only one blade. In this case, however, the cutting of the pipe happens slower than in the case of two or more blades.

In addition to or instead of the feed rate of saw units, rotational speed of the pipe may be changed. By changing the rotational speed of the pipe, it is possible to control power at different sawing stages. Sawing power can be increased by rotating the pipe at higher speed at the end stage of sawing, for instance, when the cutting length is small. In this context, a cutting length refers to the section the blade covers while touching the pipe during one blade revolution. The rotating according to the invention shortens the cutting length just before the cut-through of the wall but the rotational speed of the pipe should, however, be at its lowest just before the cut-through of the wall, because the cutting length is at its greatest at this point. At the end stage of the rotating, the cutting length becomes shorter, which allows the rotational speed to be increased. Because of the increase in the rotational speed, the sawing efficiency can be increased at the end stage and the cutting of the pipe can be accelerated without increasing the risk of breaking the blades. Thus, the pipe rotating diminishes the power demand during the cut-through. In addition, when the rotational speed of the pipe is changed, the power demand of the device can be balanced at different cutting stages.

BRIEF DESCRIPTION OF THE DRAWINGS

In the following the invention will be described in greater detail in association with preferred embodiments with reference to the attached drawings, in which.

DETAILED DESCRIPTION OF THE INVENTION

Figures 1A, 1B, 1C, 1D:
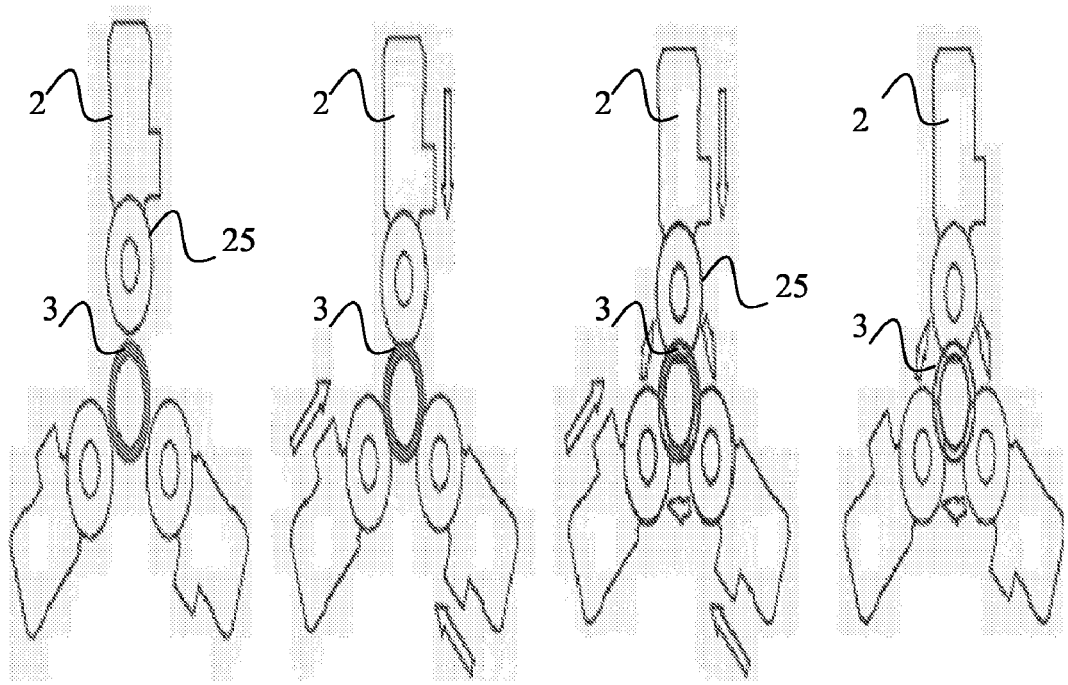
FIGS. 1A to 1D illustrate different stages of the method of the present invention for cutting a thick-walled pipe.

A reference is made to FIGS. 1A to 1D, which illustrate four stages according to the method. FIGS. 1A to 1D show an embodiment comprising three saws. FIG. 1A shows the initial state, in which the cut-off point of a pipe 3 is brought to a location where it is cut and saws 2 may be started. Before the cutting the pipe 3 is locked in its place. FIG. 1B illustrates the stage at which three saw blades 25 are driven radially towards the centre of the pipe. In FIG. 1C, the inner arrows illustrate the rotating of the pipe 3. The rotating of the pipe is started before the saw blades 25 pass through the inner surface of the pipe. Also, the rotating of the pipe may be started before or immediately after the saws of the sawing units have touched the outer circumference of the pipe 3. From FIG. 1D it appears that the radial driving of the blades 25 towards the centre of the pipe has been stopped after the cutting blade 25 has passed through the inner wall of the pipe 3. The rotating of the pipe 3 is continued until the pipe 3 has been cut, after which the saws 2 may be restored to their initial positions for a new cutting procedure.

Figure 1E:
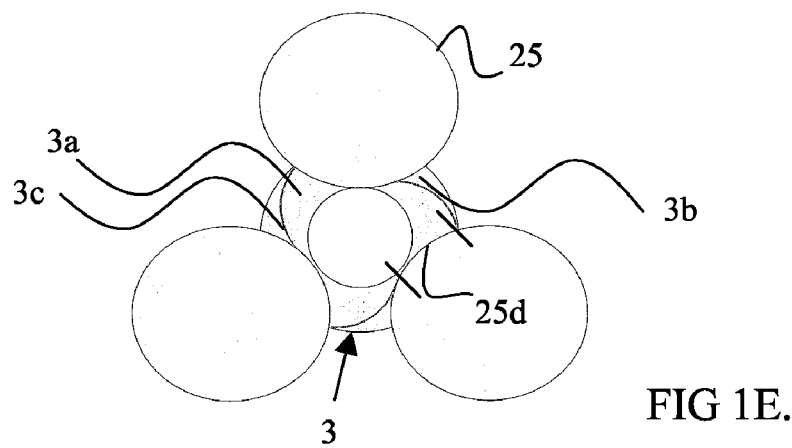
FIG. 1E illustrates how the cutting proceeds at the method stages according to FIGS. 1C and 1D.

FIG. 1E illustrates how the cutting of the pipe proceeds at the method stages according to FIGS. 1C and 1D. A pipe section 3a illustrates the remaining section of the pipe to be cut. A pipe section 3b illustrates the removed section of the pipe to be cut. 3b illustrates the sawing line, along which the blades 25 travel when the rotating of the pipe 3 is started before the blade 25 passes through the inner surface of the pipe. The shape of the sawing line may vary according to the moment the rotating starts and the feed rate of the sawing units. Reference numeral 25d refers to the cutting length, i.e. the section the blade covers when coming into contact with the pipe during one blade revolution. It may be seen from the figure that the cutting length 25d is at its greatest just before the blades 25 pass through the inner surface of the pipe. The figures also show that the cutting length is at its shortest at the beginning and end of the cutting.

Figure 2:
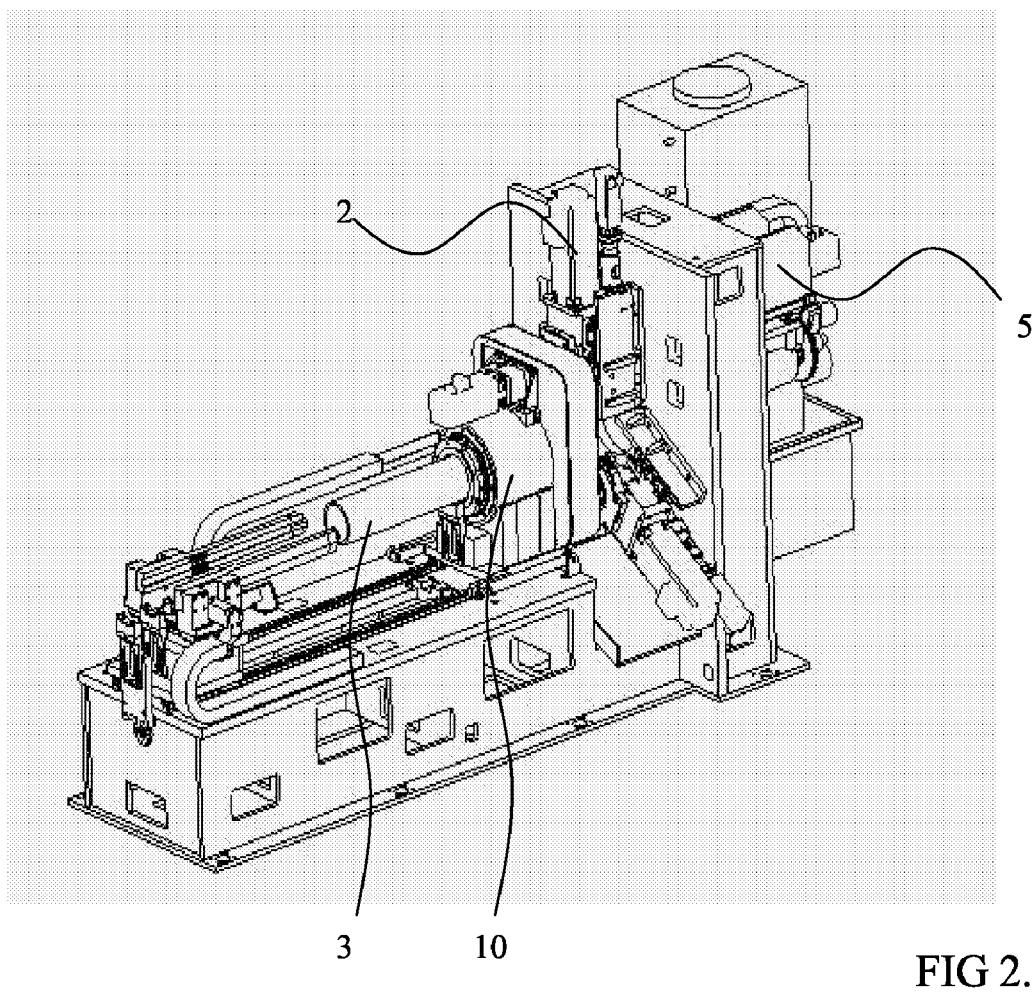
FIG. 2 shows a saw assembly of an embodiment according to the invention diagonally from the front.

FIG. 2 shows a saw assembly of an embodiment according to the invention. The saw assembly of FIG. 2 comprises three sawing units 2 but the number thereof may as well be 2 or 4. The saw assembly further comprises a transfer apparatus, by which the cut-off point of the pipe 3 is brought to the cut-off point of the saw assembly. The pipe is locked in its place by means of a fastener of a specific rotating device 10. A receiving fastener 5 in the rear of the saw assembly grips the pipe 3 at its outcoming end. During the cutting the three sawing units 2 drive radially towards the centre of the pipe 3 and the transfer apparatus is restored to its initial position. During the sawing the pipe is rotated by the rotating device 10. After the pipe is cut, the receiving fastener 5 transfers the cut section of the pipe 3 backwards and simultaneously removes it and leaves it at the discharge point behind it (not shown). The sawing units 2 may be simultaneously transferred to their initial position.

Figure 3:
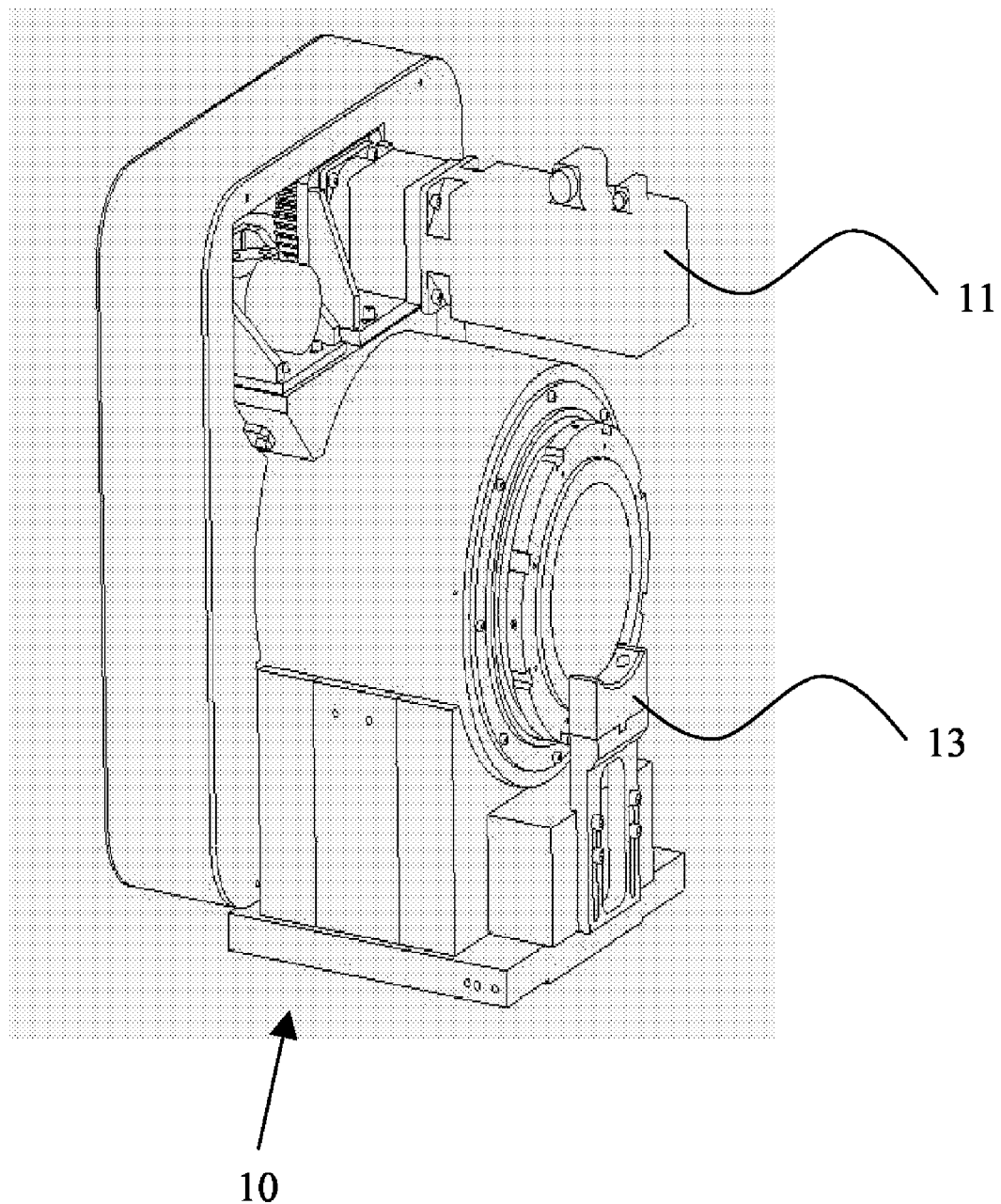
FIG. 3 shows an embodiment of a rotating device from the front.
Figure 4:
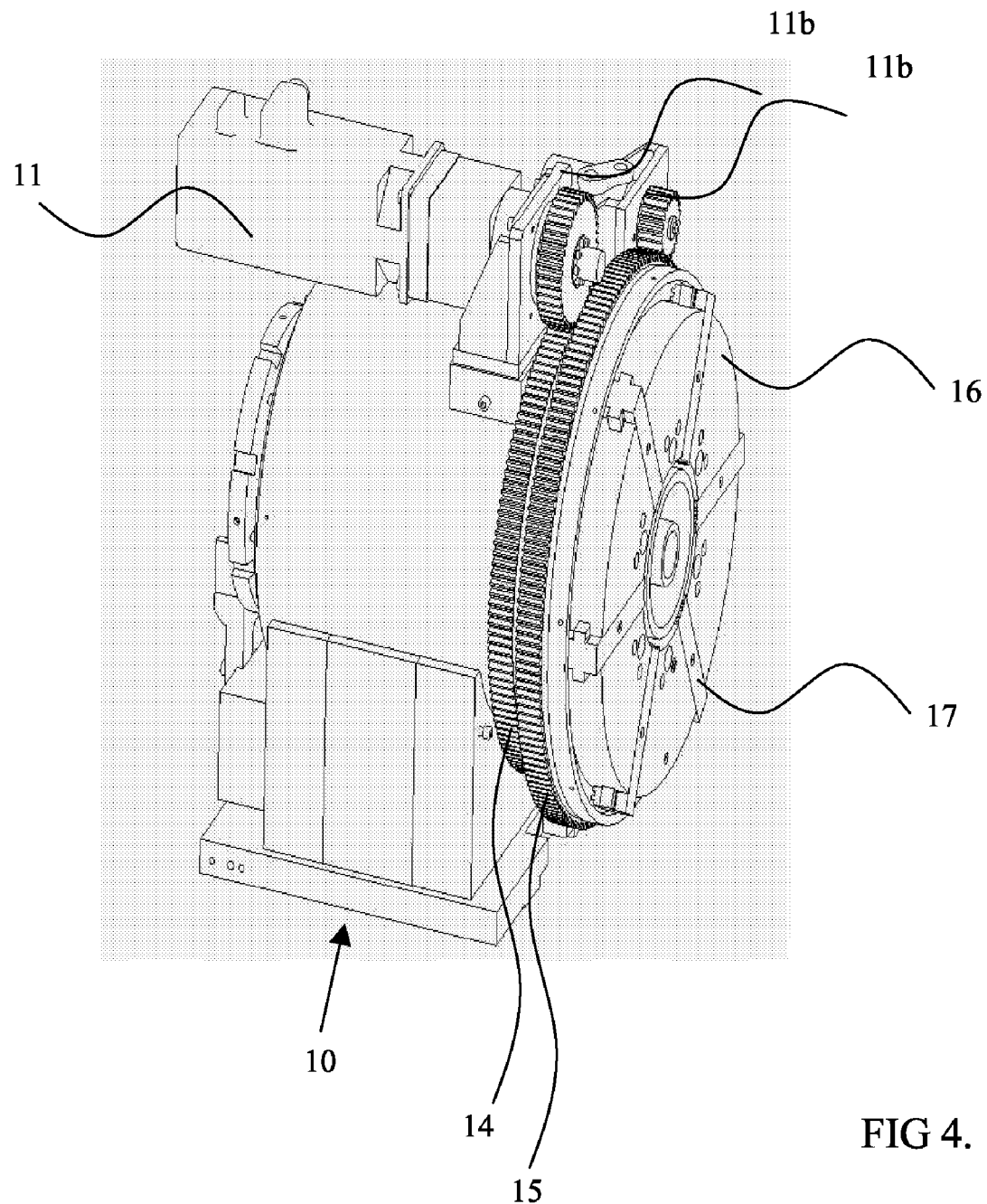
FIG. 4 shows the rotating device according to the embodiment of FIG. 3 from the opposite direction than in FIG. 3.

FIGS. 3 and 4 show an embodiment of the rotating device according to the invention. A rotating motor 11 rotates a pivoted body to rotate the pipe. At the rotating device there may be one or more supports 13 for supporting the pipe and adjustable according to the pipe diameter.

It may be seen from FIG. 4, which does not comprise a protective part covering the fastener of the rotating device, that the rotating device comprises a first rotating frame 14 rotatable with a motor 11. In the embodiment of the figure, the outer surface of the rotating frame 14 and a smaller frame 11a connected to the motor 11 have serrated surfaces but the surfaces may also be connected to each other frictionally. The rotating frame 14 is connected to a body part 16 by helical means, for example. The rotating device further comprises a second fastening frame 15 rotatable with a motor and pivotally connected between the rotating frame 14 and the body part 16. The rotating device also comprises fastening means 17 connected to the body part 16 and arranged to move in the radial direction.

Figure 5:
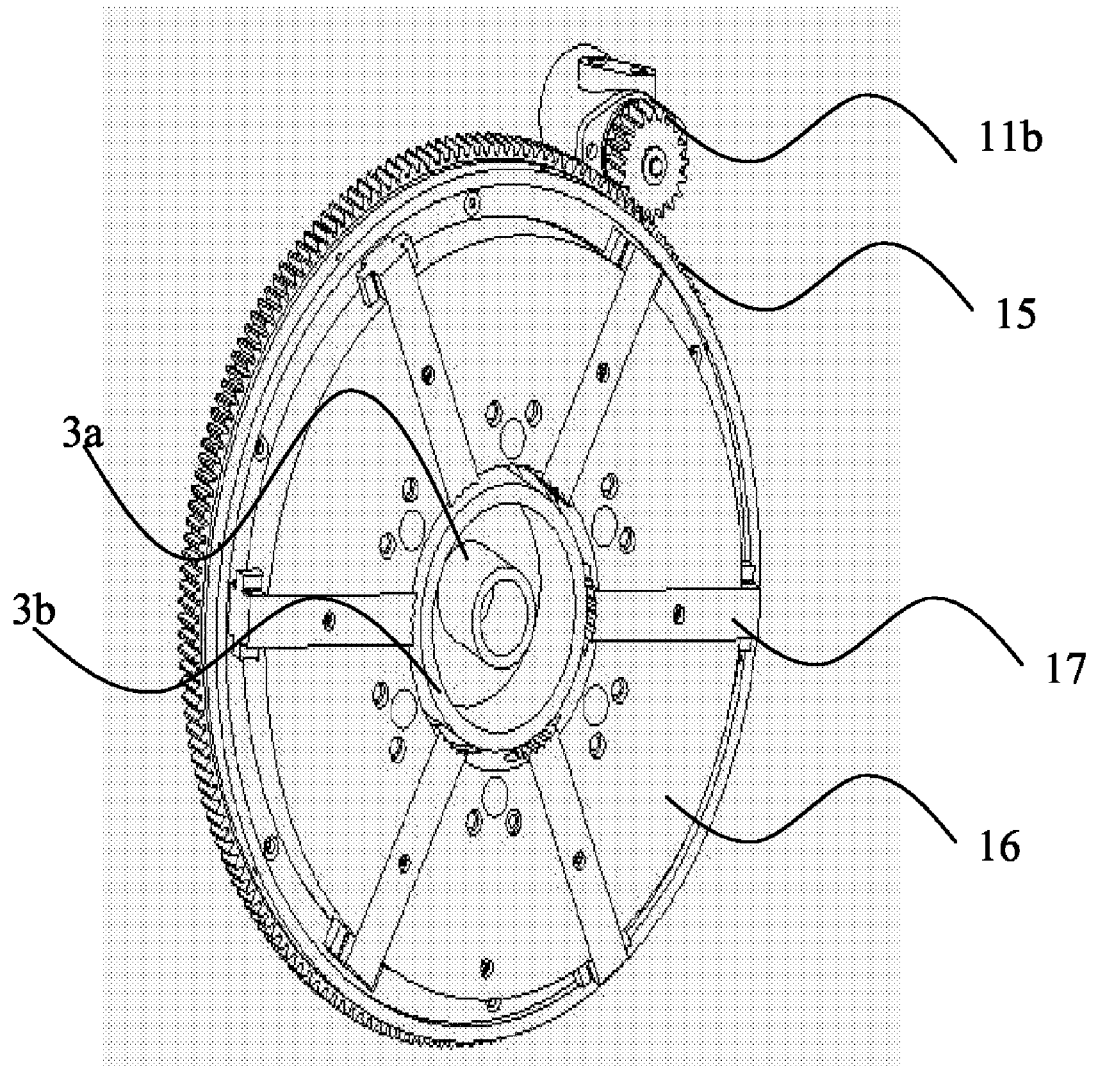
FIG. 5 is a partial view of a fastener of the rotating device from the front.
Figure 6:
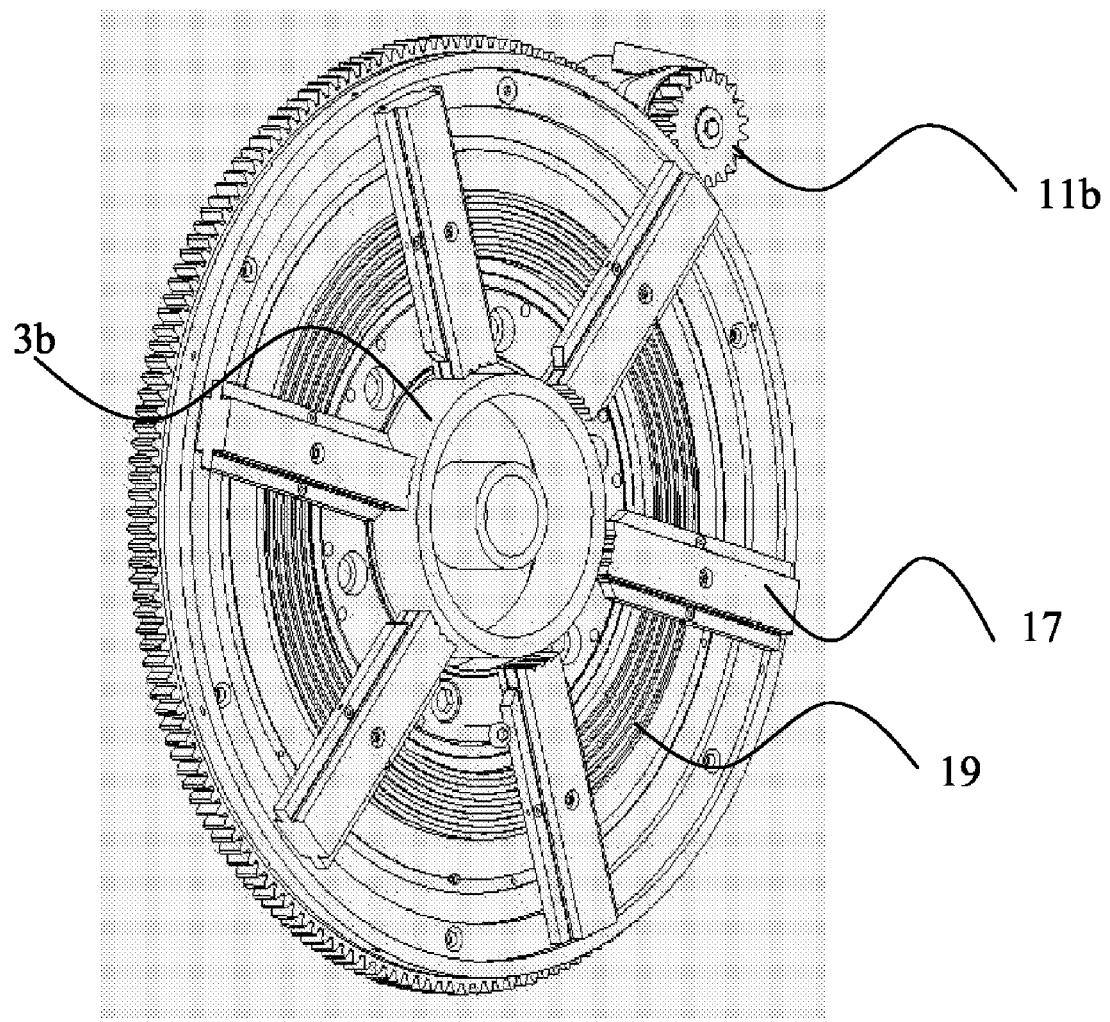
FIG. 6 shows the fastener of FIG. 5 from the front and without a body part.

FIG. 5 is a partial view of a fastener of the rotating device from the front, and FIG. 6 shows the fastener of the embodiment of FIG. 5 without the body part 16. It may be seen from FIG. 6 that the fastening frame is connected with a spiral ring 19, which is connected to the fastening means 17 so that, as the spiral ring 19 rotates with respect to the rotating frame and the body part connected thereto, the fastening means 17 move in the radial direction. In the embodiment of FIGS. 5 and 6, the fastening means 17 are fastening jaws, and there are six of them. The end part of the fastening means 17 to be connected to the pipe comprises grooves in order to provide a more secure fastening. FIG. 6 shows two pipes 3a and 3b. The purpose of the pipes 3a and 3b is to illustrate the potential maximum size 3a and the minimum size 3b of pipes to be fastened. The spiral ring 19 allows the fastening jaws to be fastened and detached by means of a motor. The use of a spiral ring enables a long motorized movement of the fastening jaws 17, which makes it possible to clamp to implement the fastening to pipes of different sizes.

Figure 10:
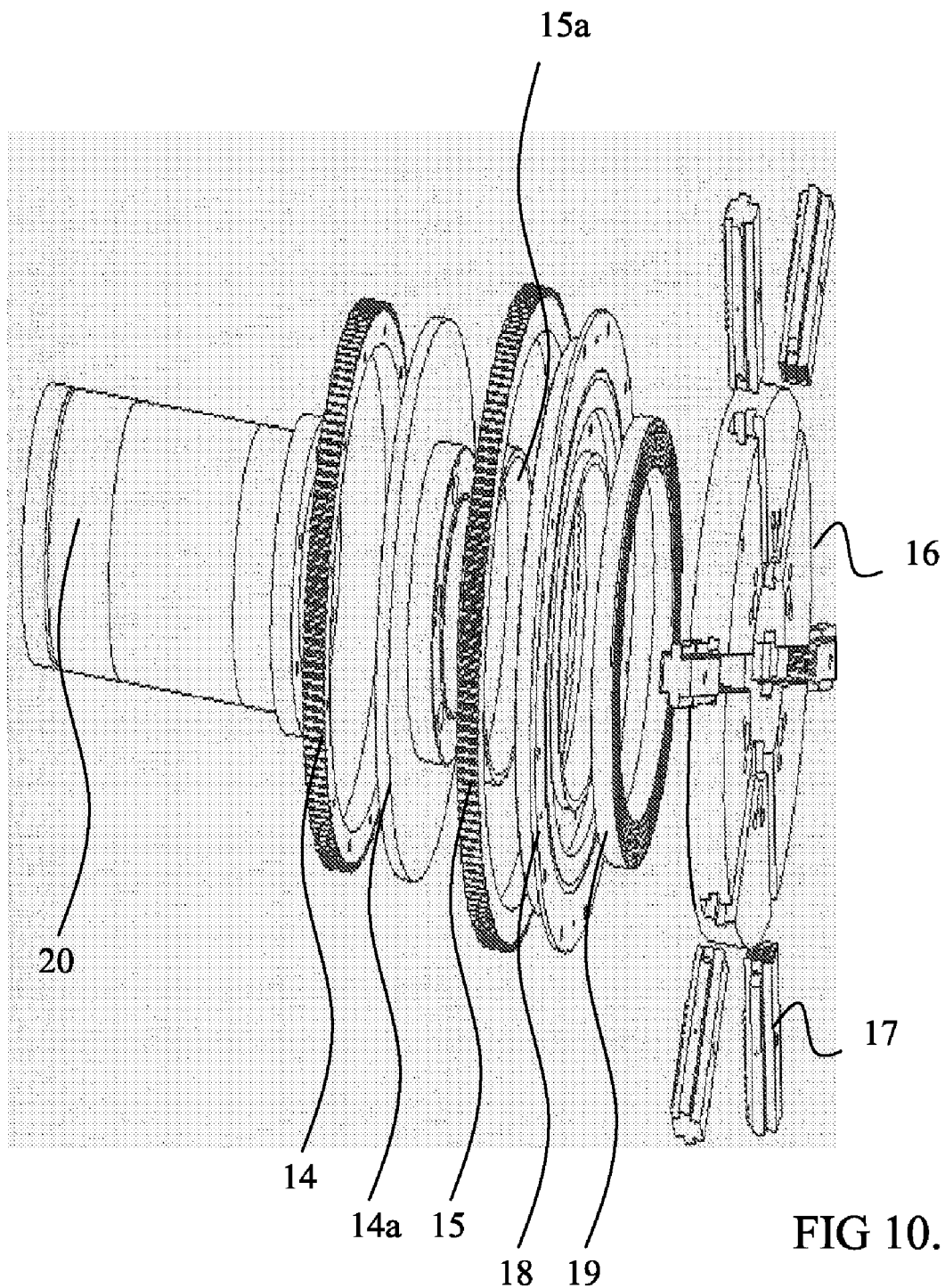
FIG. 10 is an exploded view of the fastener of the rotating device according to FIGS. 5 and 6.

FIG. 10 shows an embodiment of the fastener of the rotating device, wherein the parts are separated from each other. The rotating device comprises an axle pipe 20 and a rotating frame 14. The rotating frame is connected with a fastening flange 14a. The rotating frame and the fastening flange may also be connected with the body part 16, all parts being rotatable as one item when connected to each other.

In addition, the fastening section of the rotating device comprises a fastening frame 15, a flange 18 attachable thereto and a spiral ring 19. Similarly, the fastening frame, the flange and the spiral ring form an entity that can be rotated as one item.

Between the two above entities there are fastening means 17, which are movable between the body part 16 and the spiral ring 19. The rotational motion between the spiral ring and the body part moves the fastening means in the radial direction. There are six fastening means 17 in the figure but the number may vary. There should, however, be at least three fastening means. Due to a large radial movement the spiral ring 19 allows a plurality of fastening means 17 to be used, and the rotating means can be used for pipes of different sizes.

There may be a sliding fit between the body part 16 and the fastening means 17 to implement movement of the fastening means 17 between the section formed by the body part 16, the fastening frame 15, the flange 18 and the spiral ring 19.

Figure 7:
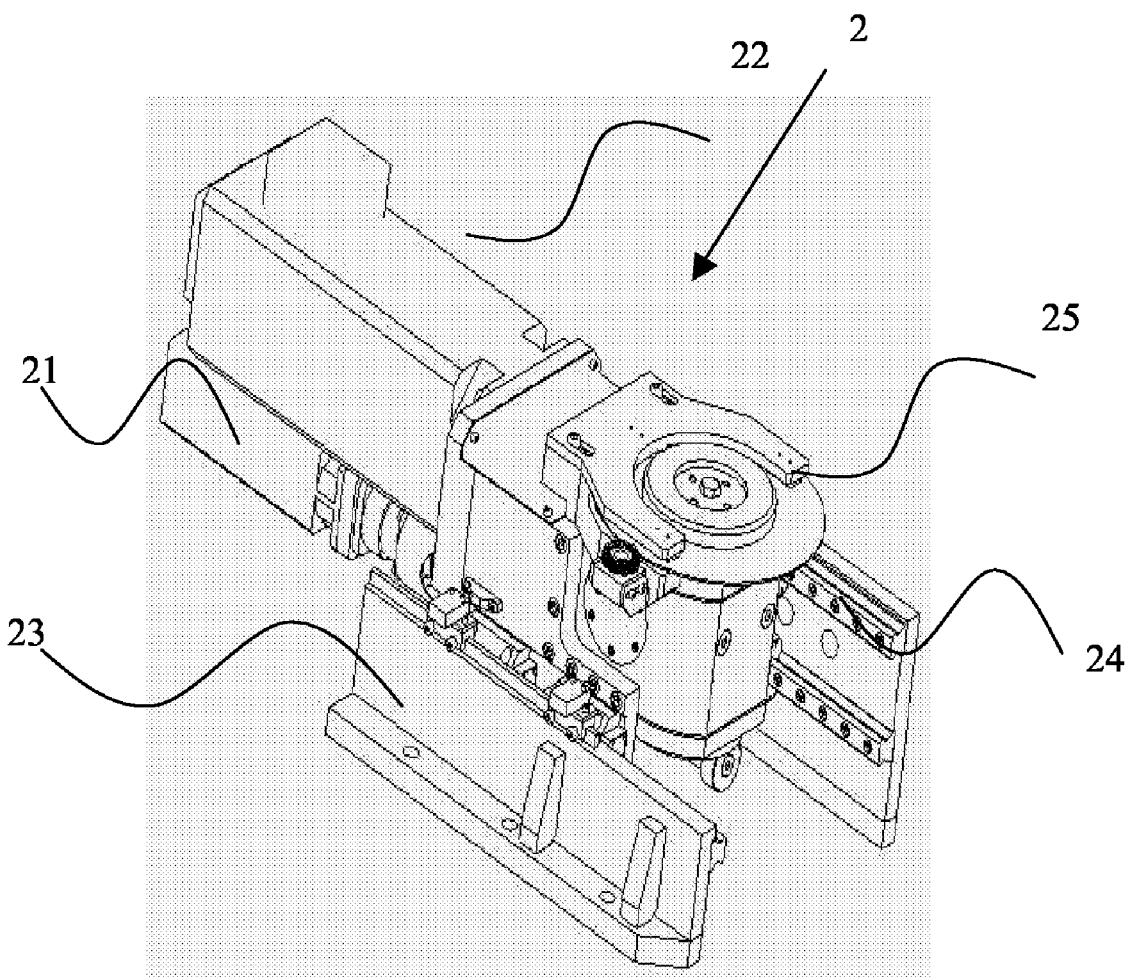
FIG. 7 shows a saw of a saw unit of the invention.

FIG. 7 shows a saw of a sawing unit of an embodiment according to the invention. The sawing unit 2 comprises a rotating motor 22 for a blade 25. On the sides of the saw, guide bars 24 for feed motion are fastened to support structures 23. The saw also comprises a driving motor 21 for feed motion in order to move the saw in the direction of the pipe radius.

Figure 8:
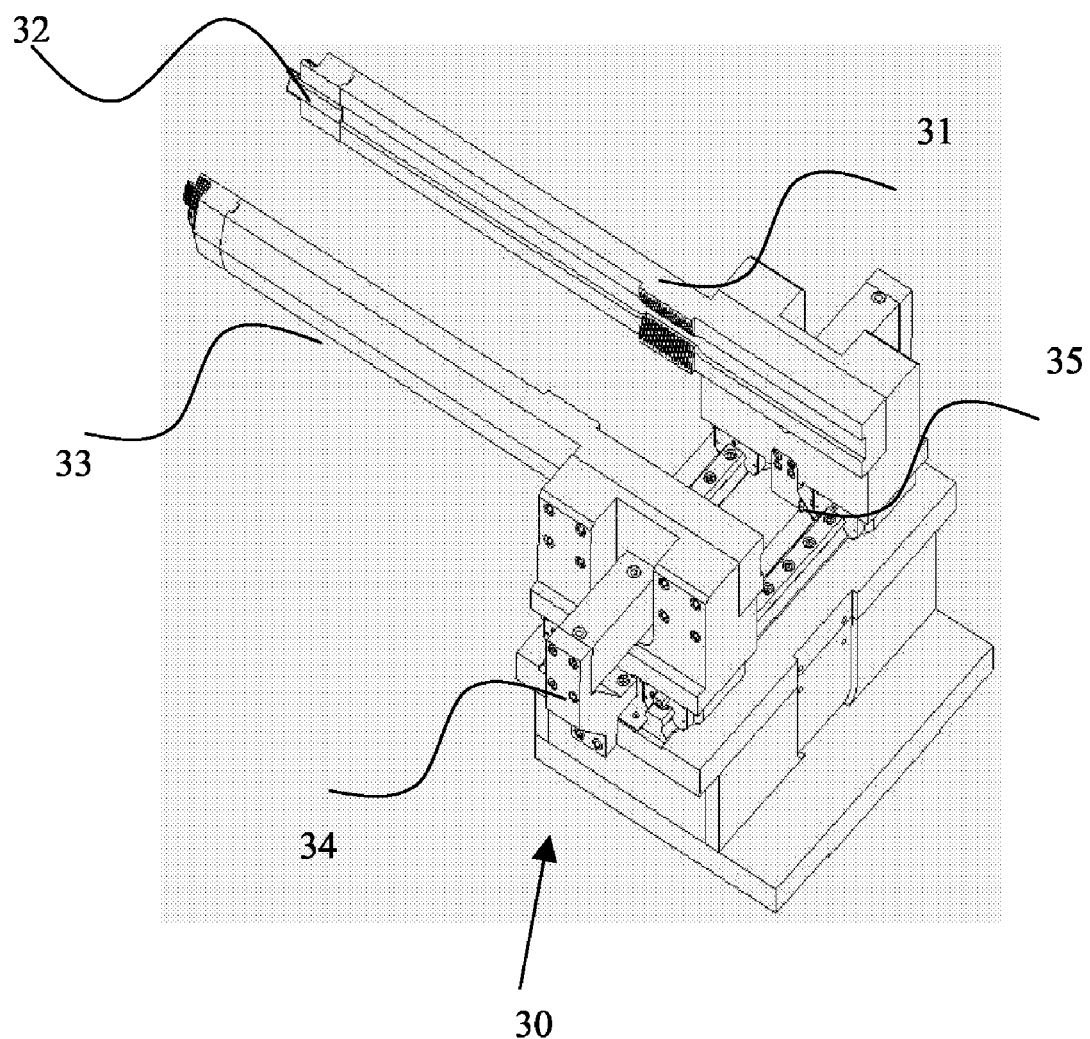
FIG. 8 shows a transfer apparatus for a cut-off saw according to the embodiment of FIG. 2 obliquely from the top.

FIG. 8 shows an embodiment of a transfer apparatus 30 for a cut-off saw. The transfer apparatus comprises motion cylinders 34 for moving transfer jaws 33 in the direction of motion guides 35. In addition, each transfer jaw of the transfer apparatus comprises jaw parts for inner grip 31 and jaw parts for outer grip 32.

Figure 9:
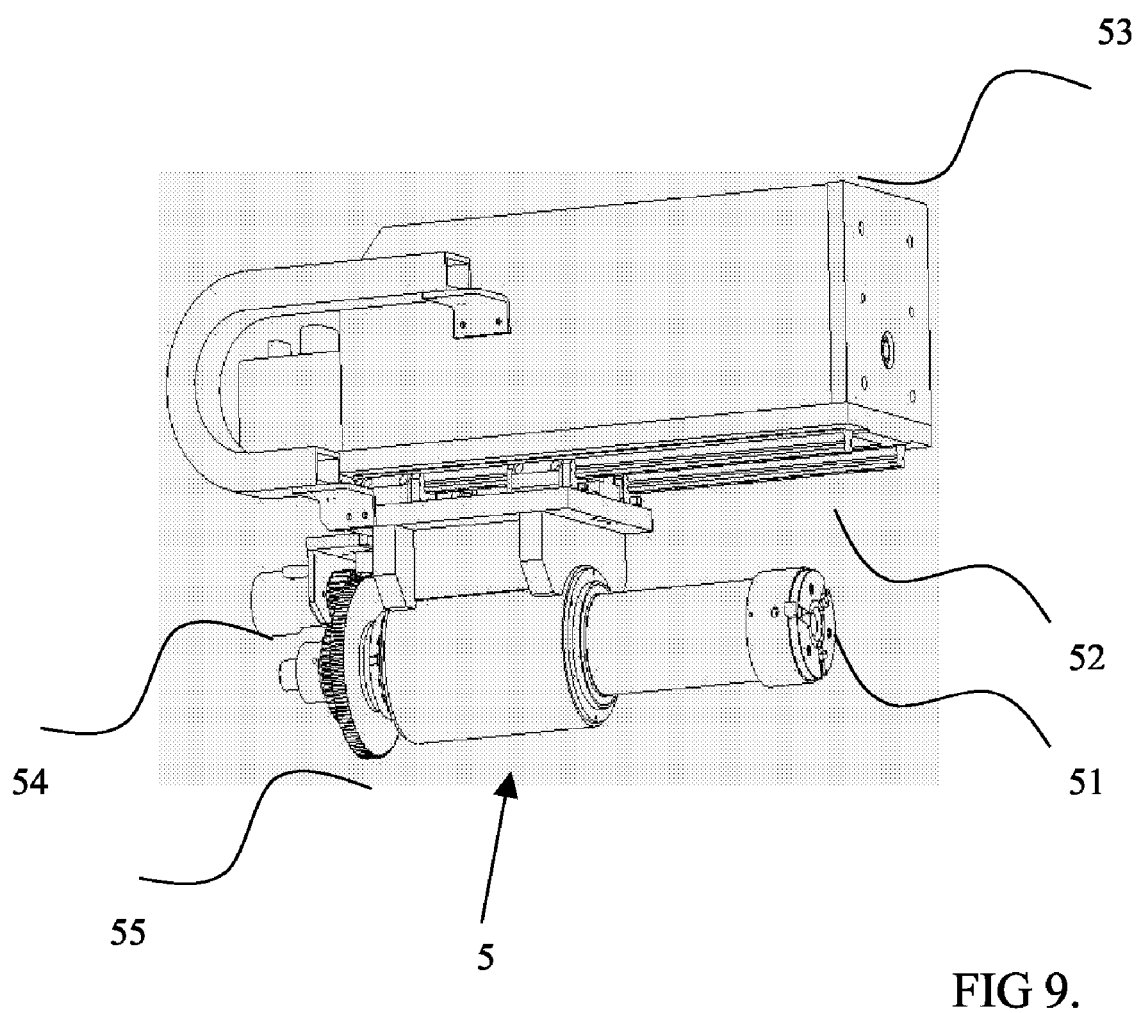
FIG. 9 shows a receiving fastener of the saw assembly of the embodiment.

FIG. 9 shows an embodiment of a receiving fastener of a saw assembly according to the invention. The receiving fastener 5 is fastened to the pipe section to be cut before the pipe is sawn, and after the cutting of the pipe the cut pipe section is transferred away by means of the receiving fastener. The receiving fastener 5 is fastened movably to a body 53 by means of guide bars 52 for longitudinal movement. A driving motor 54 for movable jaws 51 rotates a frame 55. The structure of the receiving fastener may be the same as in the rotating device.

In the following, technical values for a saw assembly according to an embodiment of the invention are presented by way of example:

| Transfer apparatus | |
|---|---|
| Gripping force | 18.8 kN/cylinder |
| Gripping speed | 60 mm/s |
| Force of transfer motion | 13.4 kN |
| Speed of transfer motion | 20 m/min |
| Rotating device and fastener (Six-jaw chuck) | |
| Fastening force | 42 kN |
| Kinetic speed | 3 mm/s |
| Torque | 2.5 kNm |
| Maximum rotative speed | 20 r/min |
| Sawing unit | |
| Motor power | 14 kW |
| Blade diameter | 315 mm |
| Blade speed | 250 to 500 r/min |
| Blade torque | 540 Nm |
| Cutting speed | 247 to 495 m/min |
| Feed force | 20 kN |
| Maximum feed rate | 3.75 m/min |
| Receiving apparatus | |
| Locking force | 25 kN |
| Locking speed | 5 mm/s |
| Kinetic force | 6.7 kNm |
| Kinetic speed | 60 m/min |

It is obvious to a person skilled in the art that that, as the technology advances, the inventive concept can be implemented in various ways. The invention and its embodiments are thus not limited to the examples described above but may vary within the scope of the claims.

The invention claimed is:

1. A method for cutting off a thick-walled pipe, wherein the pipe to be cut comprises an inner circumference closer to the longitudinal axis of the pipe and an outer circumference further from the longitudinal axis of the pipe, the method comprising:

bringing the cut-off point of the pipe to the cut-off point of a sawing unit, locking the pipe in its place by means of a fastener, sawing the pipe at the cut-off point by moving a saw of the sawing unit towards the centre of the pipe, moving at least two saws of the sawing unit during the sawing radially towards the centre of the pipe until blades of the saws pass through the inner surface of the pipe, and rotating the pipe during the sawing with respect to its longitudinal axis by means of a rotating device connected to the fastener until the pipe is cut off, characterized in that the rotating device starts to rotate the pipe before the blades of the saws pass through the inner surface of the pipe whereby, due to the rotating of the pipe, the blades of the saw work the pipe during a blade revolution only in one direction, which is directed from the outer circumference towards the inner circumference.

2. A method as claimed in claim 1, characterized in that the fastening to the pipes and rotating of the pipes is executed by means of a rotating device connected to the fastener, wherein the rotating device comprises a first rotating frame rotatable with a motor, a body part attached to the rotating frame, a second fastening frame rotatable with a motor and connected pivotally between the rotating frame and the body part, comprising fastening means connected to the body part and arranged to move in the radial direction, and a spiral ring fastened to the fastening frame and in connection with the fastening means so that, as the spiral ring rotates with respect the rotating frame and the body part fastened thereto, the fastening means move in the radial direction.

3. A method as claimed in claim 1, characterized in that the receiving fastener is fastened to the pipe section to be cut before the pipe is sawn, and after the pipe is cut, the section cut from the pipe is transferred away by means of the receiving fastener.

4. A method as claimed in claim 1, characterized in that the rotating device of the pipe adjusts the rotational speed of the pipe during the sawing.

5. A rotating device for cutting off a thick-walled pipe, characterized in that the rotating device comprises a first rotating frame rotatable with a motor, a body part attached to the rotating frame, a second fastening frame rotatable with a motor and connected pivotablly between the rotating frame and the body part, comprising fastening means connected to the body part and arranged to move in the radial direction, and a spiral fastened to the fastening frame and in connection with the fastening means so that, as the spiral ring rotates with respect to the rotating frame and the body part fastened thereto, the fastening means move in the radial direction, the rotating frame and the fastening frame have serrated outer surfaces.

6. A rotating device as claimed in claim 5, characterized in that at least three fastening means are connected to the body part and arranged to move in the radial direction.

7. A rotating device as claimed in claim 5, characterized in that in that at least five fastening means are connected to the body part and arranged to move in the radial direction.

8. A saw assembly for cutting a thick-walled pipe, the assembly comprising
  a fastener for locking the pipe to be sawn in its place, the fastener comprising gripping means arranged to move perpendicularly to the longitudinal axis of the pipe,
  a sawing unit at least two saws, the saw assembly being characterized in that
  there is provided a rotating device in connection with the fastener for rotating the pipe with respect to its longitudinal axis during the sawing wherein the rotating device comprises
  a first rotating frame rotatable with a motor,
  a body part attached to the rotating frame,
  a second fastening frame rotatable with a motor and connected pivotally between the rotating frame and the body part, comprising
  fastening means connected to the body part and arranged to move in the radial direction, and
  a spiral ring fastened to the fastening frame and in connection with the fastening means so that, as the spiral ring rotates with respect to the rotating frame and the body part fastened thereto, the fastening means move in the radial direction.

9. A saw assembly as claimed in claim 8 characterized in that it comprises at least three saws.

* * * * *